No. 895,490. PATENTED AUG. 11, 1908.
T. H. McADORY.
SYSTEM FOR THE GENERATION AND DISTRIBUTION OF ELECTRICITY.
APPLICATION FILED APR. 17, 1908.
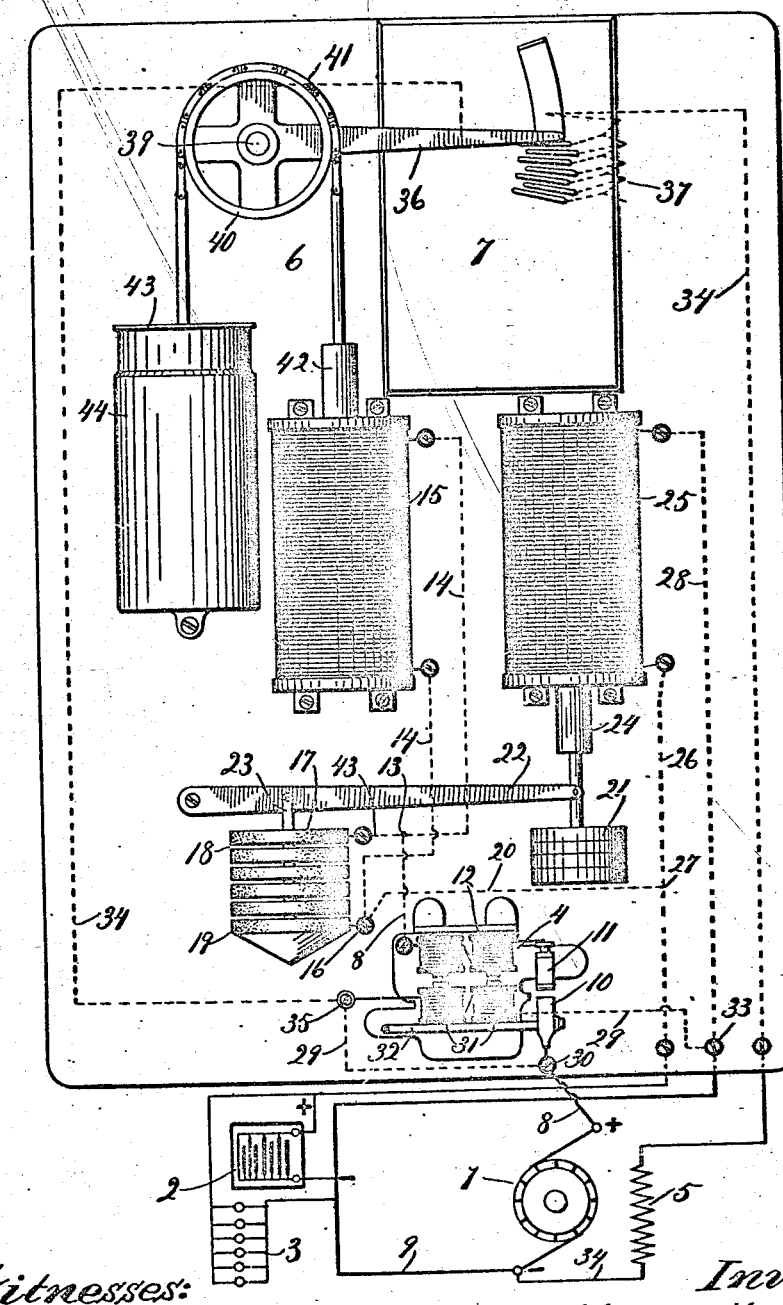
Witnesses:
W. H. Cotton
P. P. Cook
Inventor
Thomas H. McAdory
By Louis K. Gillson
Atty.

UNITED STATES PATENT OFFICE.

THOMAS H. McADORY, OF CHICAGO, ILLINOIS, ASSIGNOR TO THE ADAMS & WESTLAKE COMPANY, A CORPORATION OF ILLINOIS.

SYSTEM FOR THE GENERATION AND DISTRIBUTION OF ELECTRICITY.

No. 895,490.　　　　Specification of Letters Patent.　　　Patented Aug. 11, 1908.

Application filed April 17, 1908. Serial No. 427,652.

To all whom it may concern:

Be it known that I, THOMAS H. McADORY, a citizen of the United States, and resident of Chicago, county of Cook, and State of Illinois, have invented certain new and useful Improvements in Systems for the Generation and Distribution of Electricity, of which the following is a specification, and which are illustrated in the accompanying drawings, forming a part thereof.

The invention relates to those systems in which there is employed a generator in the form of a dynamo and a storage battery, and particularly where the dynamo is driven at variable speeds; and the object of the invention is to provide against overcharging of the battery and for the regulation of the dynamo.

It consists in the subdividing of one of the dynamo mains into two branches, one of which effects the regulation of the dynamo field and the other carries the major part of the charging current and has incorporated in it variable resistance controlled by the voltage of the battery.

In the drawings conventionally illustrating the invention there is shown at 1 a self exciting dynamo, at 2 a storage battery, at 3 a translating work circuit shown as containing a plurality of lamps and being connected with both poles of the battery, at 4 a circuit breaker for entirely cutting out the dynamo when its electromotive force is less than that of the battery, at 5 a dynamo field, at 6 a field regulator and at 7 a rheostat controlled by the regulator and being incorporated in the field circuit. These parts are all old and well known.

The main positive dynamo lead is designated 8 and the main negative dynamo lead 9 is connected directly with one branch of the work circuit 3 and the negative pole of the battery 2. The positive line 8 leads first to a movable contact 10 of the automatic cut out 4 and from the stationary contact 11 of this cut out through a pair of its coils 12 to a junction point 13. From this point one branch 14 of the main line leads to the coil 15 of the solenoid of the regulator 6 and thence to the junction point 16. The other branch 43 of the main positive line leads from the junction point 13 to a variable resistance device 17 here shown as comprising a plurality of superposed carbon disks 18. the lower one of which 19, is stationary, the upper ones resting upon it. From the junction point 16 the main line now designated 20 leads to the positive pole of the battery 2.

The carbon plates of the variable resistance 17 are forced together by means of a weight 21 hung from an oscillating arm 22 carrying a pressure bar 23, which bears upon the upper disk 18. The outer end of the arm 22 is suspended from a core 24 of a solenoid comprising a voltage coil 25 in shunt from the battery 2, one branch 26 of its circuit leading from the main positive dynamo line 20 at 27, the other branch 28 leading from the coil 25 to the negative terminal of the battery.

The circuit breaker 4 is initially controlled by a shunt line 29 leading from the main positive line 8 at 30, through a pair of coils 31 carried by the oscillating arm 32 upon which is mounted the movable contact 10, this circuit 29 being connected with the branch 28 of the voltage coil circuit at 33. The poles of the two sets of coils 12 and 31 of the circuit breaker are in a common magnetic field.

The field circuit 34 leads from the line 29 at 35, to the arm 36 of the rheostat 7 and from the rheostat resistance 37 to the field 5 and thence to the negative terminal of the dynamo. The rheostat arm 36 is pivoted at 39 and carries a sheave 40 concentric with its pivot over which turns a chain 41 to one end of which is suspended the core 42 of the solenoid 15 and to the other end of which is suspended a counterweight 43 which is shown as constituting a plunger of a dash pot 44.

When the dynamo is actuated and attains a speed sufficient to develop a voltage in excess of that of the battery 2, the coils 31 of the circuit breaker 4 are energized to a sufficient extent to bring the contact members 10, 11 into engagement. The main dynamo lead being now closed the current flows therethrough to the point 13 and is there divided, so much of it as the line will carry passing through the coil of the solenoid 15 and the remainder flowing through the variable resistance 17, the two currents reuniting at the point 16 and passing on to the battery 2. A part of the current flowing through the line 29 is diverted at the point 35 to the line 34 and energizes the field 5. As the current builds up with the increasing speed of the dynamo armature the magnetic pull of the solenoid 15 overcomes the weight 43 and moves the arm 36 downwardly to throw resistance into the field circuit and thus limit the dynamo output.

When the battery 2 has been fully charged, bringing its voltage up to the battery rating the coil 25 acquires sufficient magnetic energy to raise the weight 21 and reduce the pressure of contact between the carbon disks of the variable resistance 17 thereby increasing the resistance in the branch 43 of the main positive lead of the dynamo and reducing the current flow therethrough. This diversion of the current to the line 14 results in the immediate cutting in of sufficient additional resistance to the field circuit, immediately reduces the current output of the dynamo to the capacity of the line 14 and the charging rate of the battery is consequently correspondingly lowered. If the battery voltage is still further augmented the resistance at 17 is increased until it may become infinite.

By the means described overcharging of the battery is entirely prevented, the volume of current delivered through the line 14 being so small as to be negligible. Furthermore this means for preventing overcharging of the battery is controlled directly and solely by the battery itself, the amount of resistance interposed at 17 not being affected by the action of the dynamo except through the medium of the battery. It follows, therefore, that when the battery has been fully charged the necessary resistance at 17 is interposed and remains constant until the battery voltage is lowered without regard to whether the dynamo has or has not continued to be operated.

The system is peculiarly well adapted for use in connection with train lighting systems wherein the dynamo is driven from the car axle, but may be used in any situation.

I claim as my invention:—

1. In a system for the generation and distribution of electricity, in combination, a generator, a storage battery, mains connecting the generator and battery, one of such mains being divided into two branches, variable resistance in one branch, and an automatic regulator for such resistance controlled by the voltage of the battery.

2. In a system for the generation and distribution of electricity, in combination, a generator, a storage battery, mains connecting the generator and battery, one of such mains being divided into two branches, variable resistance in one branch, and an automatic regulator for such resistance controlled directly by the voltage of the battery.

3. In a system for the generation and distribution of electricity, in combination, a self exciting dynamo, a storage battery, mains connecting the dynamo and battery one of such mains being divided into two branches, a regulator for the dynamo field circuit controlled by one of said branches, variable resistance in the other of such branches and an automatic regulator for such resistance controlled by the voltage of the storage battery.

4. In a system for the generation and distribution of electricity, in combination, a generator, a storage battery, mains connecting the generator and battery, one of such mains being divided into two branches, variable resistance in one branch, a voltage coil in shunt from the battery and an armature coöperating with such coil and mechanically controlling the resistance.

5. In a system for the generation and distribution of electricity, in combination, a generator, a storage battery, mains connecting the generator and battery, one of such mains being divided into two branches, and variable resistance in one branch comprising a plurality of superposed disks, a weighted arm bearing on such disks, a voltage coil in shunt from the battery and a core co-acting with the coil and carrying the arm.

THOMAS H. McADORY.

Witnesses:
LOUIS K. GILLSON,
ROGER M. NEWBOLD.